(12) United States Patent
Shimazaki

(10) Patent No.: US 9,756,671 B2
(45) Date of Patent: Sep. 5, 2017

(54) COMMUNICATING APPARATUS, COMMUNICATION METHOD, AND STORAGE MEDIUM STORING PROGRAM

(71) Applicant: CANON KABUSHIKI KAISHA, Tokyo (JP)

(72) Inventor: Atsushi Shimazaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 14/257,208

(22) Filed: Apr. 21, 2014

(65) Prior Publication Data

US 2014/0323060 A1  Oct. 30, 2014

(30) Foreign Application Priority Data

Apr. 26, 2013  (JP) .................. 2013-094643

(51) Int. Cl.
*H04W 76/02* (2009.01)
*H04W 48/20* (2009.01)

(52) U.S. Cl.
CPC ......... *H04W 76/023* (2013.01); *H04W 48/20* (2013.01)

(58) Field of Classification Search
CPC ............................ H04W 76/023; H04W 48/20
USPC ................ 455/73, 41.1, 515, 524; 358/1.15; 370/329
See application file for complete search history.

(56) References Cited

U.S. PATENT DOCUMENTS

| | | | |
|---|---|---|---|
| 5,537,401 A | 7/1996 | Tadamura et al. | 370/409 |
| 7,142,503 B1 * | 11/2006 | Grant | H04L 12/2852 370/217 |
| 8,073,388 B2 | 12/2011 | Grushkevich et al. | 455/41.2 |
| 8,259,332 B2 | 9/2012 | Shimazaki | 358/1.15 |
| 8,467,726 B2 | 6/2013 | Shirakata et al. | 455/41.2 |
| 8,553,252 B2 | 10/2013 | Shimazaki | 358/1.15 |
| 2002/0063622 A1 | 5/2002 | Armstrong et al. | 340/10.31 |
| 2003/0095524 A1 | 5/2003 | Stephens et al. | 370/338 |
| 2004/0190449 A1 | 9/2004 | Mannal et al. | 370/229 |
| 2008/0279560 A1 | 11/2008 | Osawa et al. | 398/130 |
| 2011/0014876 A1 * | 1/2011 | Sakata | H04W 48/18 455/69 |
| 2012/0044536 A1 * | 2/2012 | Hall | H04W 12/08 358/1.15 |
| 2012/0092714 A1 * | 4/2012 | Suzuki | G06F 3/1212 358/1.15 |

(Continued)

FOREIGN PATENT DOCUMENTS

| | | |
|---|---|---|
| JP | 2004-104774 | 4/2004 |
| JP | 2008-154270 | 7/2008 |

(Continued)

OTHER PUBLICATIONS

Non-Final Office Action U.S. Appl. No. 14/257,178 dated Mar. 13, 2015.

(Continued)

*Primary Examiner* — Edward Urban
*Assistant Examiner* — Ralph H Justus
(74) *Attorney, Agent, or Firm* — Fitzpatrick, Cella, Harper & Scinto

(57) ABSTRACT

A communication mode for performing wireless connection of a communicating apparatus is decided based on a first command for performing wireless connection and a second command received following the first command.

15 Claims, 7 Drawing Sheets

(56) References Cited

U.S. PATENT DOCUMENTS

| | | | |
|---|---|---|---|
| 2012/0106475 A1* | 5/2012 | Jung | H04W 72/121 370/329 |
| 2012/0218918 A1 | 8/2012 | Takae et al. | 370/255 |
| 2013/0329600 A1* | 12/2013 | Vedula | H04W 76/023 370/254 |
| 2013/0331141 A1* | 12/2013 | Montemurro | H04W 48/18 455/515 |
| 2014/0002862 A1 | 1/2014 | Shimazaki | 358/1.15 |
| 2014/0031078 A1 | 1/2014 | Nishikawa | 455/552.1 |
| 2014/0068592 A1 | 3/2014 | Chitre et al. | 717/171 |
| 2014/0210693 A1* | 7/2014 | Bhamidipati | H04L 65/4092 345/2.3 |
| 2014/0217816 A1 | 8/2014 | Okada | 307/10.1 |
| 2014/0320900 A1 | 10/2014 | Moriya | 358/1.15 |
| 2014/0320908 A1 | 10/2014 | Iwauchi et al. | 358/1.15 |
| 2014/0320909 A1 | 10/2014 | Shimazaki | 358/1.15 |
| 2015/0223046 A1* | 8/2015 | Patil | H04W 8/005 370/254 |
| 2015/0351146 A1* | 12/2015 | Lee | H04W 76/023 370/329 |
| 2015/0355875 A1 | 12/2015 | Matsushita et al. | 358/1.15 |

FOREIGN PATENT DOCUMENTS

| | | |
|---|---|---|
| JP | 2010-109566 | 5/2010 |
| JP | 2011-249960 A | 12/2011 |
| JP | 2012-175614 | 9/2012 |
| JP | 2014-027538 | 2/2014 |

OTHER PUBLICATIONS

U.S. Appl. No. 14/257,178, filed Apr. 21, 2014.
U.S. Appl. No. 14/257,139, filed Apr. 21, 2014.
JP Office action, Japanese Application No. 2013094642, dated Feb. 10, 2017.
JP Office action, Japanese Application No. 2013094643, dated Feb. 17, 2017.

* cited by examiner

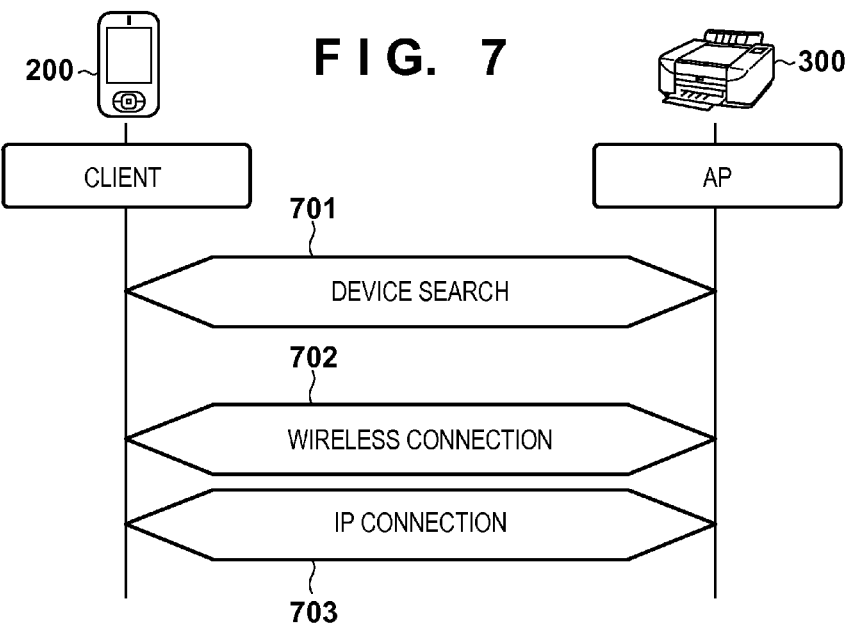
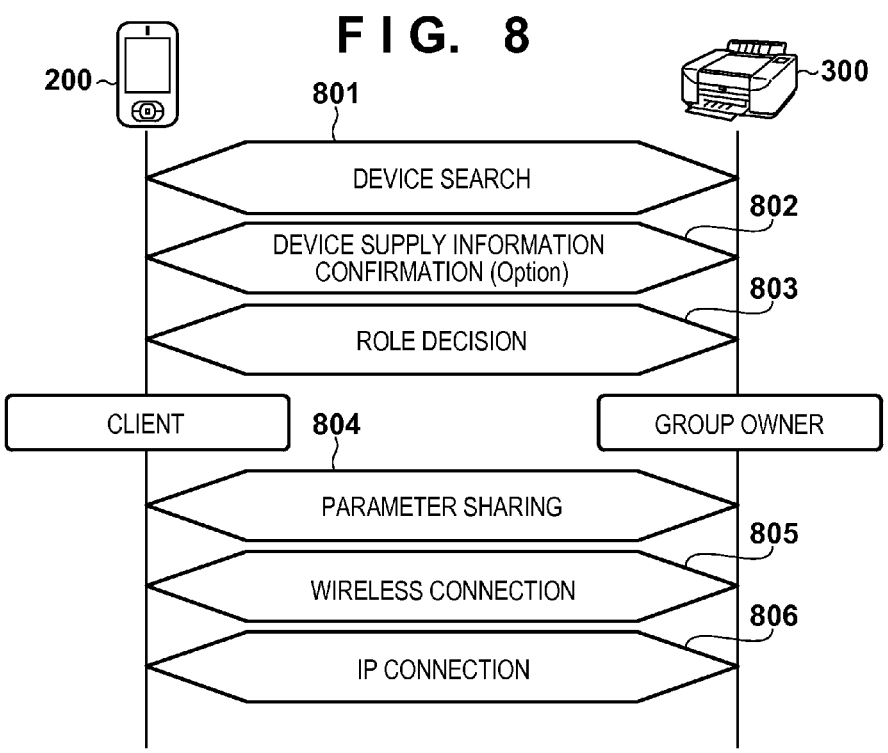

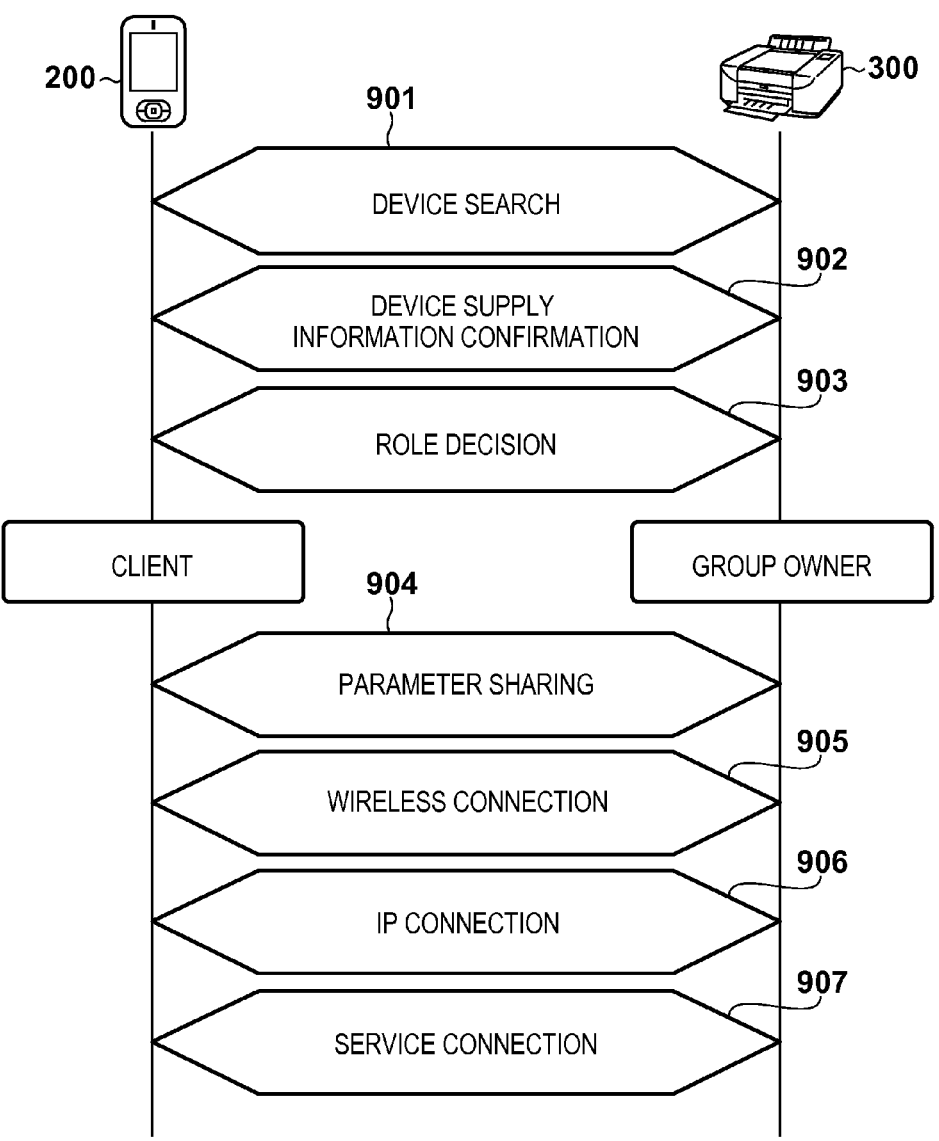

COMMUNICATING APPARATUS, COMMUNICATION METHOD, AND STORAGE MEDIUM STORING PROGRAM

BACKGROUND OF THE INVENTION

Field of the Invention

The present invention relates to a communicating apparatus for performing wireless connection, a communication method, and a storage medium storing a program.

Description of the Related Art

In a wireless communication system, in addition to a method (for example, an infrastructure mode) of wirelessly connecting to a partner apparatus via an access point, there is known a peer-to-peer (P2P) wireless connection method in which a self apparatus or a partner apparatus serves as an access point, thereby directly, wirelessly connecting with the partner apparatus.

There is known, for example, Wi-Fi Direct® as a standard for implementing such P2P wireless connection method. A Wi-Fi Direct compatible apparatus can serve as an access point (group owner), thereby allowing direct wireless connection with a partner apparatus. At this time, whether the partner apparatus or the self apparatus serves as an access point is decided according to a sequence called Group Owner Negotiation (Japanese Patent Laid-Open No. 2011-249960).

When a given apparatus on a wireless communication system transmits a probe response command to a received probe request command, an apparatus which has transmitted the probe request command can discover the partner apparatus to be wirelessly connected (device search). After the device search, a sequence of, for example, confirming an IP address and device information indicating an apparatus type is executed, thereby establishing a wireless connection.

When transmitting a probe response command to a received probe request command, it is recommended that the probe response command is transmitted within a range defined by the standard of a wireless connection method by which the self apparatus operates. For example, if a probe request command has been transmitted by an extended Wi-Fi Direct compatible apparatus and the self apparatus serves as a non-extended Wi-Fi Direct compatible apparatus, a probe response command may be transmitted within a range defined by non-extended Wi-Fi Direct. This is because even if information (including various kinds of attributes) added to the probe request command includes uninterpretable information, it is possible to respond to the received probe request command based on only interpretable information. That is, although a corresponding wireless connection sequence or subsequent processing is different, the partner apparatus is discovered. If the subsequent sequence is executed in this state, wireless connection may fail due to a parameter acquisition error or the like, or processing after wireless connection may fail.

SUMMARY OF THE INVENTION

An aspect of the present invention is to eliminate the above-mentioned problems with the conventional technology. The present invention provides a communicating apparatus capable of performing wireless connection in an appropriate communication mode, a communication method, and a storage medium storing a program.

The present invention in its one aspect provides a communicating apparatus comprising: a reception unit configured to receive a command for performing wireless connection; and a decision unit configured to decide a communication mode for performing wireless connection of the communicating apparatus, based on a first command received by the reception unit and a second command received following the first command.

According to the present invention, it is possible to perform wireless connection in an appropriate communication mode.

Further features of the present invention will become apparent from the following description of exemplary embodiments with reference to the attached drawings.

BRIEF DESCRIPTION OF THE DRAWINGS

FIG. 7 is a sequence chart for explaining a connection sequence in a software access point mode;

FIG. 8 is a sequence chart for explaining a connection sequence in a WFD mode;

FIG. 9 is a sequence chart for explaining a connection sequence in a WFD extended mode.

DESCRIPTION OF THE EMBODIMENTS

Figure 1:
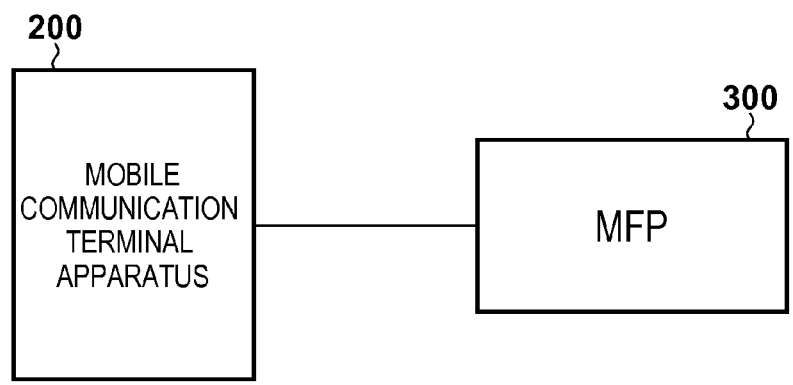
FIG. 1 is a view showing the configuration of a system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components and a description thereof will be omitted.

FIG. 1 is a view showing the configuration of a wireless communication system including a mobile communication terminal apparatus and a print apparatus (MFP). A mobile communication terminal apparatus 200 is an apparatus including a wireless LAN (WLAN) communication unit and a near field wireless communication unit. Note that near field wireless communication indicates wireless communication whose communication range is a relatively narrow predetermined range (for example, 1 m to several cm or less), which is represented by NFC. The mobile communication terminal apparatus 200 may be a personal information terminal such as a PDA (Personal Digital Assistant), a mobile phone, a digital camera, or the like, and can perform wireless communication (WLAN) with a print apparatus 300. The print apparatus (MFP) 300 need only be wirelessly communicable with the mobile communication terminal apparatus 200, and may additionally have a reading function (scanner), a FAX function, and a telephone function. In this embodiment, an MFP (Multi Function Printer) having a reading function and a printing function will be exemplified. Each of the mobile communication terminal apparatus 200 and the MFP 300 has a near field wireless communication unit using NFC. Even if no power is supplied to the mobile communication terminal apparatus 200, it is possible to perform near field wireless communication by moving the mobile communication terminal apparatus 200 closer to the MFP 300 within a predetermined distance where NFC communication is possible. The MFP 300 can wirelessly communicate with a terminal on a wireless network (a network in which communication can be performed using TCP/IP) using a WLAN communication unit. One or both of the mobile communication terminal apparatus 200 and the MFP 300 may perform wireless communication using only the WLAN communication unit without the near field wireless communication unit.

Figure 2:
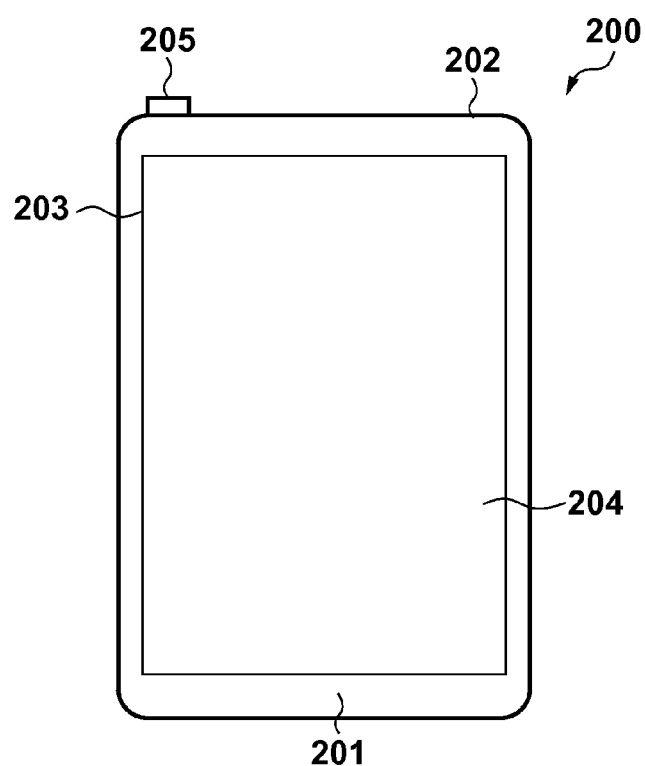
FIG. 2 is a view showing the outer appearance of a mobile communication terminal apparatus.

FIG. 2 is a view showing the outer appearance of the mobile communication terminal apparatus 200. In this embodiment, a smartphone will be exemplified. The smartphone indicates a multi-function mobile phone which incorporates a camera, web browser, email function, and the like in addition to functions of a mobile phone. An NFC unit 201 serving as a near field wireless communication unit is a unit for performing communication using NFC. When the NFC unit 201 is moved closer to a partner NFC unit within a predetermined distance (for example, about 10 cm), they can communicate with each other using NFC.

A WLAN unit 202 is a unit used to perform communication by WLAN. Assume that the WLAN unit 202 can perform data (packet) communication in a WLAN system complying with, for example, IEEE802.11 series. Examples of wireless communication using the WLAN unit 202 include communication based on Wi-Fi Direct (WFD), and communication using a communication mode such as a software AP mode, ad hoc mode, and infrastructure mode. A display unit 203 is a display having an LCD display mechanism. An operation unit 204 includes a touch-panel operation mechanism, and detects an operation by the user. As a representative operation method, the display unit 203 displays button icons and a software keyboard, and when the user touches them, operation events are detected. A power key 205 is a hard key used to turn on/off the power.

Figure 3A:
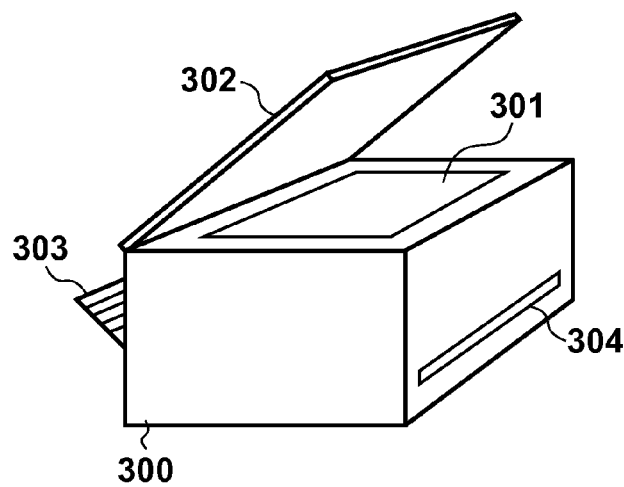
FIGS. 3A and 3B are views showing the outer appearance of an MFP.
Figure 3B:
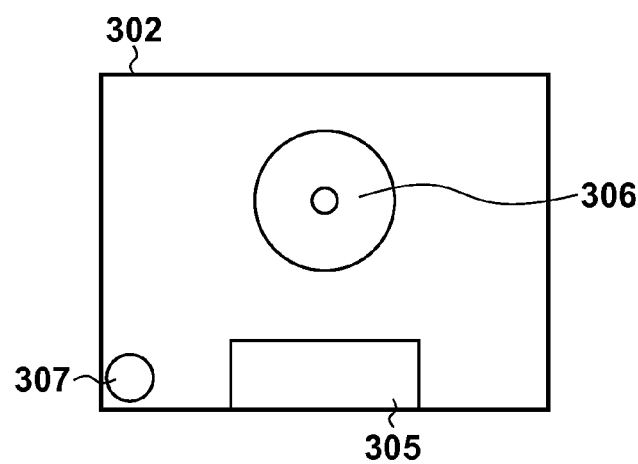

FIGS. 3A and 3B are views showing the outer appearance of the MFP 300. Referring to FIG. 3A, a document table 301 is a glass-like transparent table on which a document to be read by a scanner (reading unit) is placed. A document cover 302 is a cover used to press a document when the scanner reads the document, and prevent external leakage of light from a light source, with which the document is irradiated at the time of reading. A printing paper insert port 303 is an insert port on which paper sheets of various sizes can be set. Paper sheets set on the printing paper insert port 303 are conveyed one by one to a printing unit, and are discharged from a printing paper discharge port 304 after printing is performed by the printing unit.

Referring to FIG. 3B, an operation display unit 305 and an NFC unit 306 are arranged on the upper portion of the document cover 302. The operation display unit 305 will be described in detail with reference to FIG. 4. The NFC unit 306 is a unit used to perform near field wireless communication, and is a place where the mobile communication terminal apparatus 200 is moved closer to the MFP 300. A predetermined distance (about 10 cm) from the NFC unit 306 is an effective distance of NFC communication. A WLAN antenna 307 is an antenna which is used to perform communication by WLAN and is embedded in the MFP.

Figure 4:
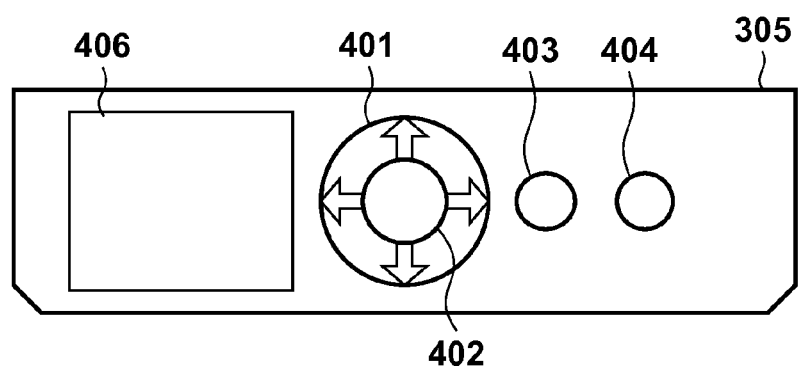
FIG. 4 is a plan view showing an operation display unit.

FIG. 4 is a plan view showing the operation display unit 305. A display unit 406 is a display screen used to display images and a user interface such as an operation menu, and includes, for example, a dot matrix LCD. A 4-way selector 401 is used for operations such as cursor movements on the display unit 406. A set key 402 is a key used to input settings. A function key 403 is used for an operation such as a function setting operation. A start key 404 is used to issue a function execution instruction such as a print start instruction.

Figure 5:
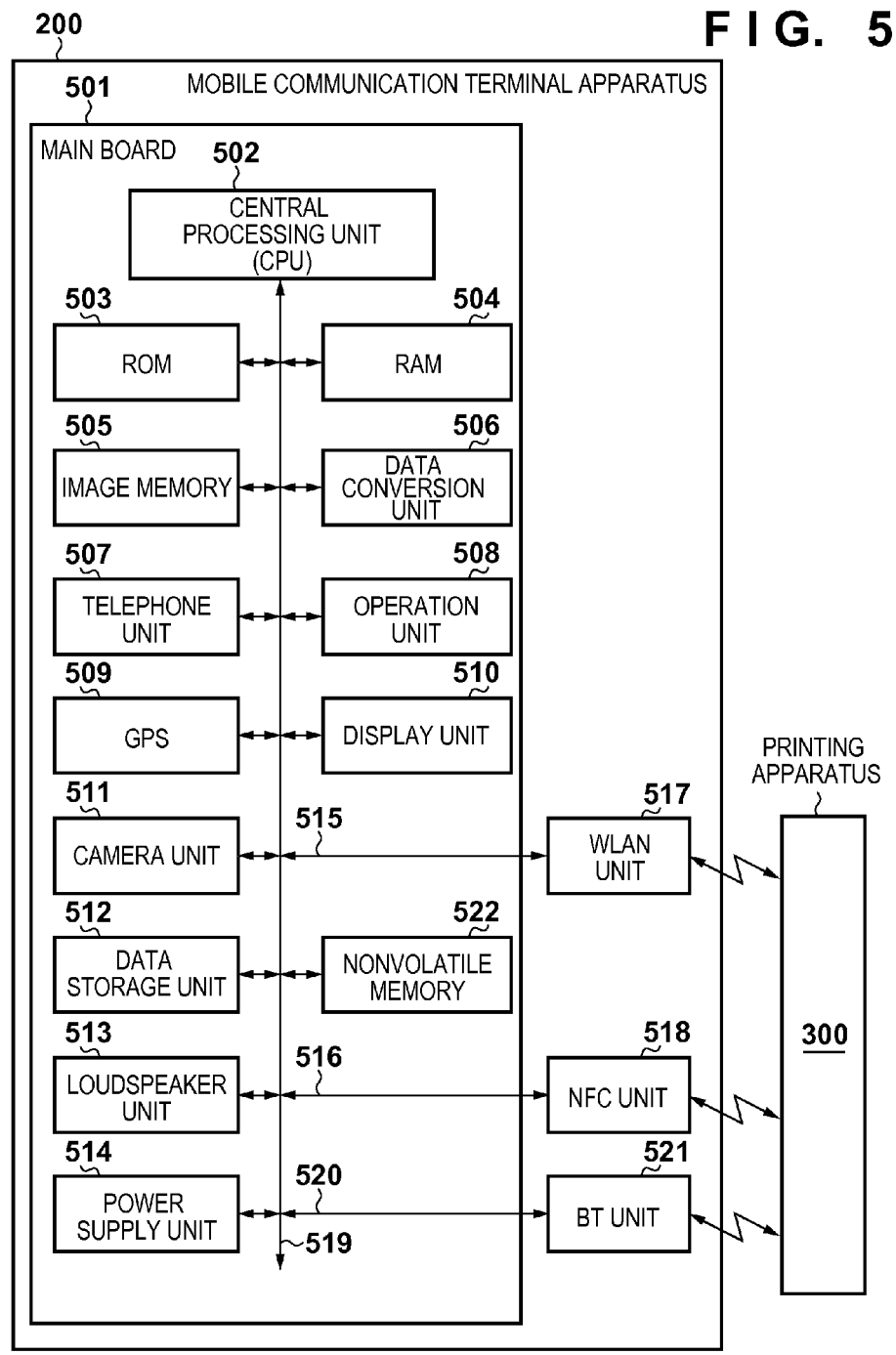
FIG. 5 is a block diagram showing the arrangement of the mobile communication terminal apparatus.

FIG. 5 is a block diagram showing the arrangement of the mobile communication terminal apparatus 200. The mobile communication terminal apparatus 200 includes a main board 501 for executing main control of the apparatus itself, a WLAN unit 517 for performing WLAN communication, an NFC unit 518 for performing NFC communication, and a BT (Bluetooth®) unit 521 for performing Bluetooth® communication.

In the main board 501, a CPU 502 is a system control unit, and controls the overall mobile communication terminal apparatus 200. The following processing by the mobile communication terminal apparatus 200 is executed under the control of the CPU 502. A ROM 503 stores control programs to be executed by the CPU 502, an embedded operating system (OS) program, and the like. In this embodiment, the respective control programs stored in the ROM 503 execute software control such as scheduling and task switching under the management of the embedded OS stored in the ROM 503.

A RAM 504 is implemented by an SRAM (Static RAM) or the like, stores data such as program control variables, also stores data such as setting values registered by the user and management data of the mobile communication terminal apparatus 200, and is allocated with various work buffer areas.

An image memory 505 is implemented by a memory such as a DRAM (Dynamic RAM), and temporarily stores image data received via a communication unit and those read out from a data storage unit 512 so as to be processed by the CPU 502. Note that the communication unit is a general term for communication functions including the WLAN unit 517, NFC unit 518, and BT unit 521.

A nonvolatile memory 522 is implemented by a memory such as a flash memory, and stores data to be saved even after power-off. Note that the memory structure is not limited to this. For example, the image memory 505 and the RAM 504 may share a memory, or data may be backed up in the data storage unit 512. In this embodiment, a DRAM is used as the image memory 505. However, the present invention is not limited to this since another storage medium such as a hard disk or a nonvolatile memory may be used.

A data conversion unit 506 executes analysis of data of various formats, and data conversion such as color conversion and image conversion. A telephone unit 507 controls a telephone line, and implements telephone communication by processing audio data input/output via a loudspeaker unit 513. An operation unit 508 controls signals of the operation unit 204 (FIG. 2). A GPS (Global Positioning System) 509 acquires position information such as the current latitude and longitude of the mobile communication terminal apparatus 200. A display unit 510 electronically controls the display contents of the display unit 203 (FIG. 2), allows various input operations, and can display operation states, status conditions, and the like of the MFP 300.

A camera unit 511 has a function of electronically recording and encoding an image input via a lens. An image captured by the camera unit 511 is saved in the data storage unit 512. The loudspeaker unit 513 realizes a function of inputting or outputting a speech for a telephone function, and also an alarm notification function and the like. A power supply unit 514 is implemented by a portable battery, and controls power supply to the apparatus. A power supply state includes a battery dead state in which the battery has no remaining amount, a power-off state in which the power key 205 is not pressed, an active state in which the apparatus is normally active, and a power saving state in which the apparatus is active but is set in a power saving mode.

The mobile communication terminal apparatus 200 incorporates three communication units used to perform wireless communication, and can perform wireless communication by WLAN, NFC, and Bluetooth®. Thus, the mobile communication terminal apparatus 200 performs data communication with another device such as an MFP. Each communication unit converts data into packets, and transmits the packets to the other device. Conversely, each communication unit converts packets coming from another external device into original data, and transmits the data to the CPU 502. The WLAN unit 517, NFC unit 518, and BT unit 521 are connected to the main board 501 via bus cables 515, 516, and 520, respectively. The WLAN unit 517, NFC unit 518, and BT unit 521 are units each used to attain communication complying with its standard.

The respective components (the ROM 503 to the power supply unit 514, WLAN unit 517, NFC unit 518, BT unit 521, and nonvolatile memory 522) of the main board 501 are connected to each other via a system bus 519 managed by the CPU 502.

Figure 6:
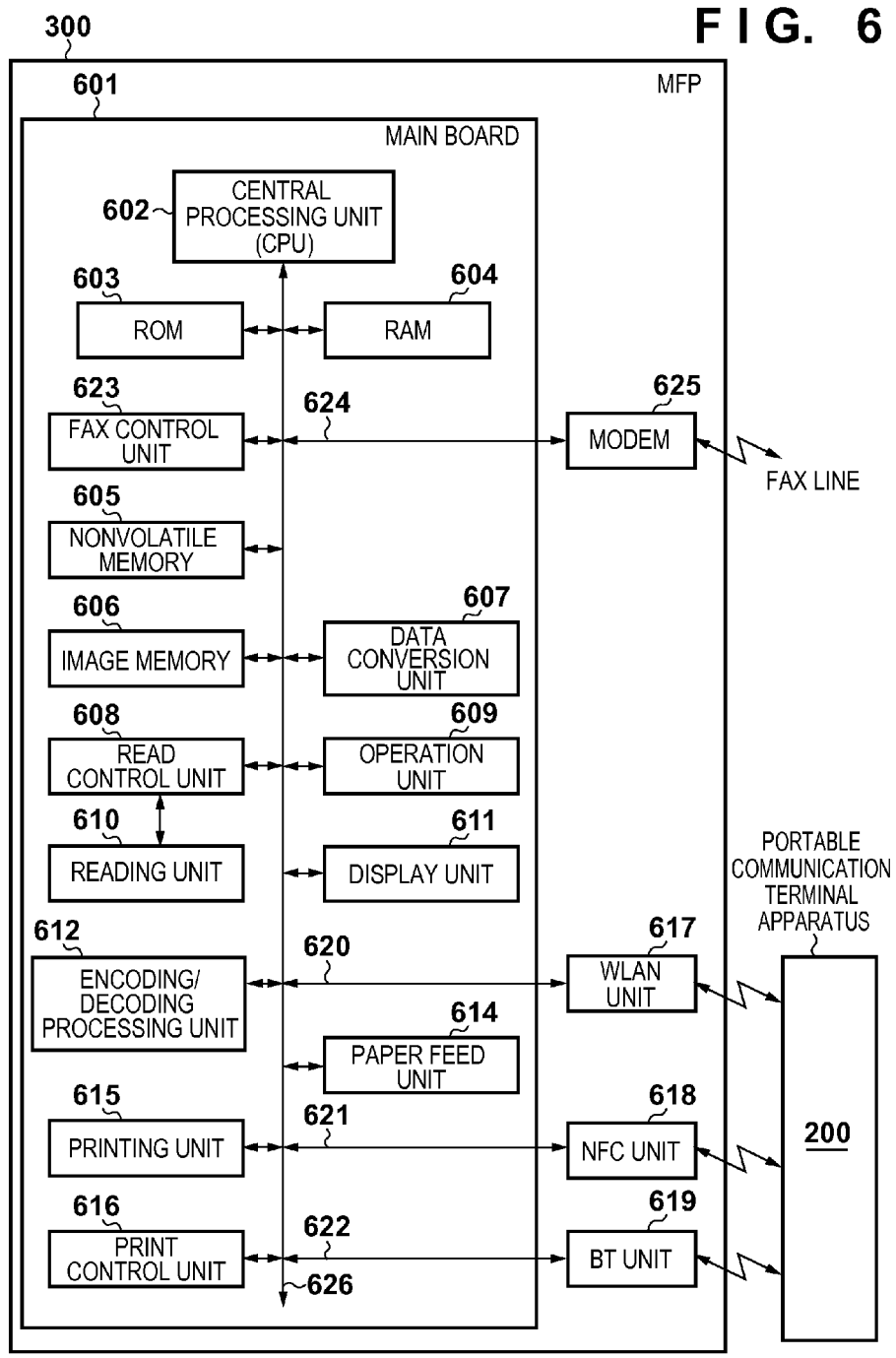
FIG. 6 is a block diagram showing the arrangement of the MFP.

FIG. 6 is a block diagram showing the arrangement of the MFP 300. The MFP 300 includes a main board 601 for executing main control of the apparatus itself, a WLAN unit 617 for performing WLAN communication, an NFC unit 618 for performing NFC communication, and a BT unit 619 for performing Bluetooth® communication.

In the main board 601, a CPU 602 is a system control unit, and controls the overall MFP 300. The following processing by the MFP 300 is executed under the control of the CPU 602. A ROM 603 stores control programs to be executed by the CPU 602, an embedded operating system (OS) program, and the like. In this embodiment, the respective control programs stored in the ROM 603 perform software control such as scheduling and task switching under the management of the embedded OS stored in the ROM 603. A RAM 604 is implemented by an SRAM (Static RAM) or the like, stores data such as program control variables, also stores data such as setting values registered by the user and management data of the MFP 300, and is allocated with various work buffer areas.

A nonvolatile memory 605 is implemented by a memory such as a flash memory, and stores data to be saved even after power-off. An image memory 606 is implemented by a memory such as a DRAM (Dynamic RAM), and stores image data received via a communication unit, those processed by an encoding/decoding processing unit 612, and those acquired via a memory card controller 516. Also, the memory structure is not limited to this, similarly to the memory structure of the mobile communication terminal apparatus 200. A data conversion unit 607 executes analysis of data of various formats, conversion from image data into print data, and the like. Note that the communication unit is a general term for communication functions including the WLAN unit 617, NFC unit 618, and BT unit 619.

A read control unit 608 controls a reading unit 610 (for example, a CIS image sensor (contact type image sensor)) to optically read an image on a document. Next, an image signal obtained by converting the read image into electrical image data is output. At this time, various kinds of image processing such as binarization processing and halftone processing may be performed for the image signal, thereby outputting the resultant data.

An operation unit 609 and a display unit 611 correspond to the operation display unit 305 shown in FIG. 4. The encoding/decoding processing unit 612 executes encoding/decoding processing and enlargement/reduction processing for image data (JPEG, PNG, or the like) handled by the MFP 300. A paper feed unit 614 holds paper sheets used in printing. A paper sheet can be fed from the paper feed unit 614 under the control of a print control unit 616. Especially, as the paper feed unit 614, a plurality of paper feed units can be prepared so as to hold a plurality of types of paper sheets in one apparatus. Then, the print control unit 616 can control to select a paper feed unit to be used to supply paper sheets.

The print control unit 616 performs various kinds of image processing such as smoothing processing, printing density correction processing, and color correction for image data to be printed, and outputs the resultant data to a printing unit 615. The printing unit 615 can adopt an inkjet printer which prints an image by discharging, from a printhead, ink supplied from an ink tank. The print control unit 616 also serves to periodically read out information of the printing unit 615, and update information in the RAM 604. More specifically, the print control unit 616 updates status information such as the remaining amount of an ink tank and a printhead state.

The MFP 300 also incorporates three communication units used to perform wireless communication, similarly to the mobile communication terminal apparatus 200, and a description of these communication units will be omitted since their functions are the same. The WLAN unit 617, NFC unit 618, and BT unit 619 are connected to the main board 601 via bus cables 620, 621, and 622, respectively. The respective components (the CPU 602 to the BT unit 619) of the main board 601 are connected to each other via a system bus 626 managed by the CPU 602.

[Peer-to-Peer Wireless Connection (P2P Wireless Connection)]

The mobile communication terminal apparatus 200 and the MFP 300 can establish a peer-to-peer (P2P) wireless connection complying with Wi-Fi Direct (WFD). WFD is a standard stipulated by Wi-Fi Alliance, and described in "Wi-Fi Peer-to-Peer (P2P) Technical Specification Version 1.1". The mobile communication terminal apparatus 200 and MFP 300 which are WFD compatible apparatuses have a software access point (soft AP) function serving as an access point. This allows the mobile communication terminal apparatus 200 and the MFP 300 to directly, wirelessly connect with each other by WFD without intervention of another access point. Among a plurality of WFD compatible apparatuses, an apparatus to serve as a soft AP is decided according to a sequence called Group Owner Negotiation. An apparatus which is a WFD compatible apparatus and serves as an access point will be particularly referred to as a group owner hereinafter.

When a probe response command (Probe Response frame) is transmitted in response to a probe request command (Probe Request frame) sent by one apparatus on a wireless communication system, the apparatus which has sent the probe request command can discover a partner apparatus to be wirelessly connected (device search (Discovery)). After that, a sequence of, for example, confirming an IP address and device information indicating an apparatus type is executed, thereby establishing a wireless connection.

Especially for P2P wireless connection, the probe request command contains information (P2P elements) about P2P wireless connection.

Three types of operation modes are defined for wireless communication of the MFP 300 according to this embodiment. The first type is a mode (soft AP mode) in which, unlike P2P wireless connection, the self apparatus simulates the operation of an access point by software settings and wirelessly connects to a partner apparatus. The second type is a mode (WFD mode) in which the self apparatus is a WFD compatible apparatus and serves as a group owner. The third type is a mode (WFD extended mode) in which the self apparatus is an extended WFD compatible apparatus and serves as a group owner. Extended WFD indicates a mode in which an extended function at a service level is added to WFD. For example, a probe request command complying with extended WFD contains attribute information (information elements and WFD extended attributes) for defining the specific specifications. The information elements are added to the probe request command complying with WFD in the form of arguments. The WFD mode indicates a mode in which the self apparatus serves as a non-extended WFD apparatus. The mode of the MFP 300 may be designated by the user through the operation unit 609 or the like, or may be fixed.

When transmitting a probe response command to a received probe request command, it is recommended that the probe response command is transmitted within a range defined by the standard of a wireless connection method by which the self apparatus operates. For example, if a probe request command has been transmitted by a WFD compatible apparatus (WFD mode) and the self apparatus is an extended WFD compatible apparatus (WFD extended mode), a probe response command may be transmitted within a range defined by extended WFD even though the self apparatus does not operate in the WFD mode. This is because even if information (including various kinds of attributes) added to the probe request command includes uninterpretable information, it is possible to respond to the received probe request command based on only interpretable information. That is, although a corresponding wireless connection sequence or subsequent processing is different, the partner apparatus is discovered. If, however, the subsequent sequence is executed in this state, wireless connection may fail due to a parameter acquisition error or the like, or processing after wireless connection may fail.

[Connection Sequence in Each Mode]

A device search sequence in each mode will now be described. FIG. 7 is a sequence chart for explaining a connection sequence when the MFP 300 operates in the soft AP mode and the mobile communication terminal apparatus 200 operates in the infrastructure mode (to also be referred to as mode A hereinafter). A device search phase 701 is executed between the mobile communication terminal apparatus 200 and the MFP 300. In the device search phase 701, the mobile communication terminal apparatus 200 transmits a device search request command to the MFP 300. The device search request command corresponds to the above-described probe request command. Upon receiving the device search request command, the MFP 300 transmits a device search response command to the mobile communication terminal apparatus 200. Upon receiving the device search response command, the mobile communication terminal apparatus 200 discovers the partner apparatus to be wirelessly connected.

After the device search phase 701, a wireless connection phase 702 is executed. In the wireless connection phase 702, an identification ID such as an SSID and security information such as a password are set. Especially in the infrastructure mode, the user may set the identification ID, password, and the like. After the wireless connection phase 702, an IP connection phase 503 is executed, in which each apparatus confirms the IP address of the partner apparatus. After the IP connection phase 703, a wireless connection is established at the application level such as printing or facsimile.

FIG. 8 is a sequence chart for explaining a connection sequence when the mobile communication terminal apparatus 200 and the MFP 300 are in the WFD mode (to also be referred to as mode B hereinafter). The same description as that for the device search phase 701 shown in FIG. 7 applies to a device search phase 801 shown in FIG. 8. Note that a device search request command in the WFD mode contains, in the form of arguments, attribute information (information elements) for defining the WFD-specific specifications.

In the WFD mode, after the device search phase 801, a device supply information confirmation phase 802 may be executed. In the device supply information confirmation phase 802, each apparatus confirms device information of the partner apparatus. The device supply information confirmation phase 802 corresponds to, for example, P2P Provision Discovery. Note that the device information indicates, for example, a device category or type such as a printer or scanner. Note also that execution of the device supply information confirmation phase 802 is essential in the WFD extended mode. However, in the WFD mode, the device supply information confirmation phase 802 is an optional function, and thus may not be executed.

After the device search phase 801 or the device supply information confirmation phase 802, a role decision phase 803 is executed. In the role decision phase 803, one of the mobile communication terminal apparatus 200 and the MFP 300 is decided as a group owner. The decision method is determined as "Group Owner Negotiation" in the WFD specification, and a group owner is decided using parameters 0 to 15 representing the degree of desirability of being a group owner. FIG. 8 shows a case in which the MFP 300 is decided as a group owner and the mobile communication terminal apparatus 200 is decided as a client in the role decision phase 803. After the group owner and client are decided, a parameter sharing phase 804 is executed. In the parameter sharing phase 804, the apparatuses share various parameters indicating a push button method, PIN code method, and the like. The parameter sharing phase 804 corresponds to, for example, Wi-Fi Protected Setup.

After the execution of the parameter sharing phase 804, a wireless connection phase 805 and an IP connection phase 806 are executed. The same description as that for the wireless connection phase 702 and IP connection phase 702 of FIG. 7 applies to the wireless connection phase 805 and IP connection phase 806. In the WFD mode and the WFD extended mode (to be described later), the identification ID such as an SSID, the password, and the like are automatically set without the intervention of the user.

FIG. 9 is a sequence chart for explaining a connection sequence when the mobile communication terminal apparatus 200 and the MFP 300 are in the extended WFD mode (to also be referred to as a WFD extended mode or mode C hereinafter). The WFD extended mode is obtained by adding an extended function at the service level (application level) to the WFD mode. Therefore, information elements for defining extended WFD-specific specifications are added to a device search request command as attribute information. The same description as that for the device search phase 601 to the IP connection phase 606 of FIG. 8 applies to a device search phase 901 to an IP connection phase 906 of FIG. 9. However, the sequence shown in FIG. 9 is different from that shown in FIG. 8 in that the device supply information confirmation phase 902 is always executed. In the WFD extended mode, after the execution of the IP connection phase 906 of FIG. 9, a service connection sequence complying with the WFD extended mode-specific specifications is executed, thereby establishing a wireless connection at the application level such as printing or facsimile.

[Mode Control Sequence]

A processing procedure in which the MFP 300 controls the operation mode of the self apparatus upon receiving a command from the mobile communication terminal apparatus 200 will be described.

Figure 10:
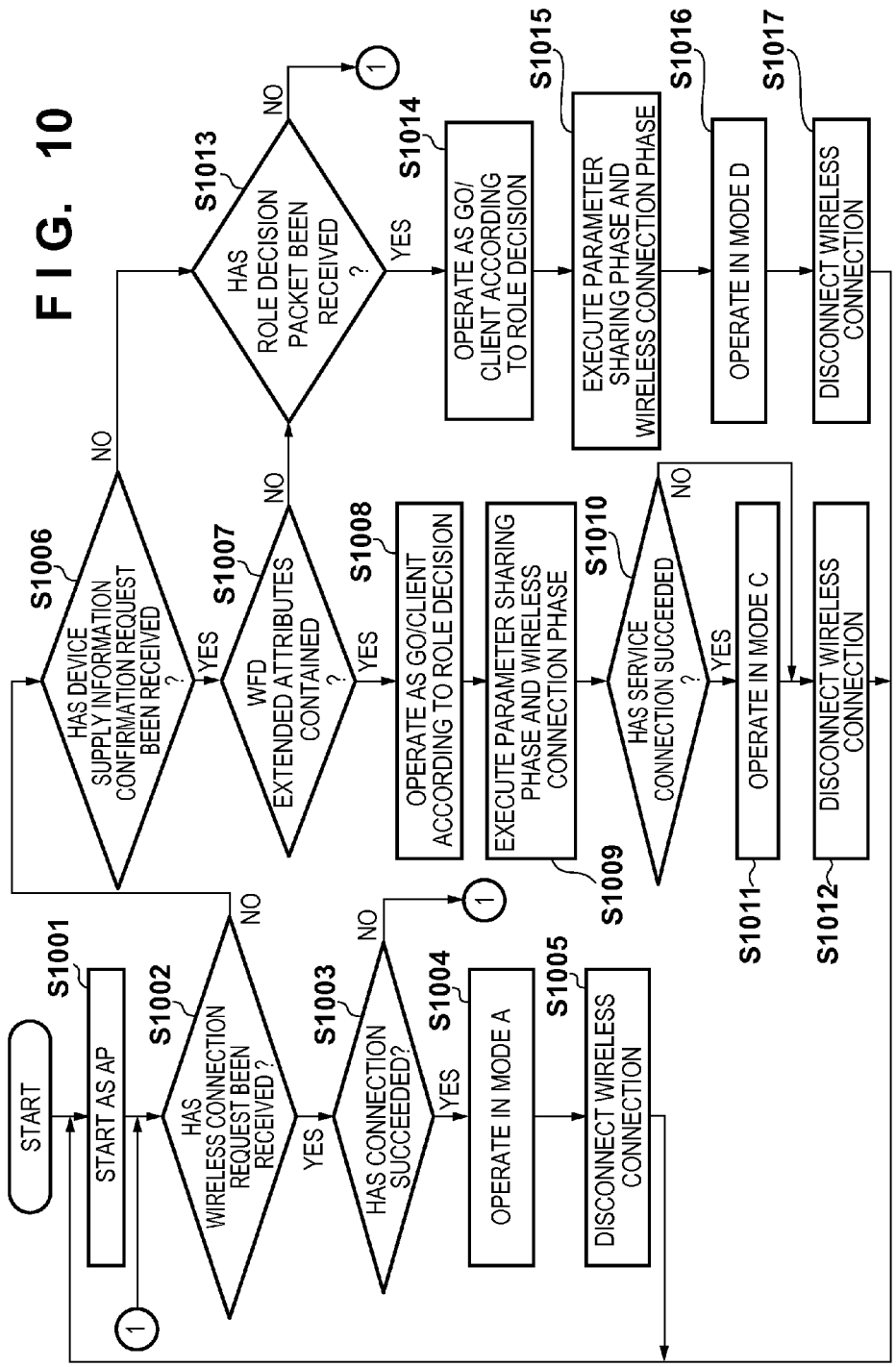
FIG. 10 is a flowchart illustrating the processing procedure of a mode control method for the MFP.

FIG. 10 is a flowchart illustrating the processing procedure of a mode control method for the MFP 300. Each process shown in FIG. 10 is implemented when, for example, the CPU 602 of the MFP 300 loads a control program stored in the ROM 603 into the RAM 604, and executes the control program.

In step S1001, the MFP 300 starts in the soft AP mode, and receives a device search request command from the mobile communication terminal apparatus 200. The device search request command itself is a common command in modes A to C.

In step S1002, the MFP 300 determines whether a command to be used in the wireless connection phase has been received from the mobile communication terminal apparatus 200. The command to be received is, for example, a wireless connection request command. If a command has been received, the process advances to step S1003.

As shown in FIGS. 7 to 9, only in the soft AP mode (mode A), the wireless connection phase is executed immediately after the device search phase. In this embodiment, therefore, if it is determined in step S1002 that a wireless connection request command has been received, that is, if a device search request command and a wireless connection request command have been received in the order named, it is determined that the mobile communication terminal apparatus 200 is in the infrastructure mode.

In step S1003, the MFP 300 determines whether execution of the wireless connection phase 502 has succeeded or failed. If it is determined that execution of the wireless connection phase 502 has succeeded, in step S1004 the MFP 300 sets the self apparatus in the soft AP mode (mode A), and executes a sequence at the application level in the IP connection phase 503 and subsequent phases. Upon completion of the processing, the MFP 300 disconnects the wireless connection in step S1005, thereby repeating the processing from step S1001. On the other hand, if it is determined in step S1003 that execution of the wireless connection phase 502 has failed, the processing is also repeated from step S1001.

If it is determined in step S1002 that no wireless connection request command has been received, the MFP 300 determines in step S1006 whether a command to be used in the device supply information confirmation phase has been received. The command to be received is, for example, a device supply information confirmation request command. If it is determined that this command has been received, the process advances to step S1007.

In step S1007, the MFP 300 determines whether the received device supply information confirmation request command contains WFD extended mode attribute information. If it is determined that attribute information is contained, the process advances to step S1008.

As shown in FIGS. 8 and 9, in either the WFD mode or the WFD extended mode, the device supply information phase may be executed immediately after the device search phase. In this embodiment, therefore, if it is determined in step S1006 that a device supply information confirmation request command has been received, a mode corresponding to the command is determined by determining whether the command contains WFD extended mode attribute information.

In step S1008, the MFP 300 executes the role decision phase 903. When the role decision phase 903 is executed, it is decided which of the mobile communication terminal apparatus 200 and the MFP 300 serves as a group owner or a client. In step S1009, the MFP 300 executes the parameter sharing phase 904 to the IP connection phase 906. In step S1010, the MFP 300 determines whether execution of the service connection phase 907 has succeeded or failed. If it is determined that execution of the service connection phase 907 has succeeded, the MFP 300 sets the self apparatus in the WFD extended mode (mode C) in step S1011, thereby executing a subsequent sequence at the application level. Upon completion of the processing, the MFP 300 disconnects the wireless connection in step S1012, thereby repeating the processing from step S1001. If it is determined in step S1010 that execution of the service connection phase 907 has failed, the processing is repeated from step S1001 through step S1012.

If it is determined in step S1006 that no command to be used in the device supply information confirmation phase has been received or if it is determined in step S1007 that the command contains no WFD extended mode attribute information, the process advances to step S1013. A case in which it is determined in step S1007 that the command contains no WFD extended mode attribute information indicates a case in which the device supply information confirmation request command has been received in FIG. 8.

In step S1013, the MFP 300 determines whether a command to be used in the role decision phase has been received. If it is determined that no command has been received, this does not correspond to any case shown in FIG. 7, 8, or 9. Therefore, the received command is ignored by, for example, discarding it, thereby repeating the processing from step S1001. On the other hand, if it is determined that a command has been received, the process advances to step S1014.

In step S1014, the MFP 300 executes the role decision phase 603. When the role decision phase 603 is executed, it is decided which of the mobile communication terminal apparatus 200 and the MFP 300 serves as a group owner or a client. In step S1015, the MFP 300 executes the parameter sharing phase 604 to the IP connection phase 606.

In step S1016, the MFP 300 sets the self apparatus in the WFD mode (mode D), and executes a subsequent sequence at the application level. Upon completion of the processing, the MFP 300 disconnects the wireless connection in step S1017, thereby repeating the processing from step S1001.

As described above, according to this embodiment, based on a command received after the device search phase, the MFP 300 can decide and set the operation mode of the self apparatus in which it is possible to transmit a command complying with the operation mode of the partner apparatus. As a result, the user need not manually switch the mode, thereby improving the convenience.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

A program may be executed by a single computer or a plurality of computers in cooperation. Further, hardware such as a circuit for executing part of the program may be arranged, and the processing described in the embodiment may be executed by cooperation between the hardware and the computer which executes the software.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-094643, filed Apr. 26, 2013, which is hereby incorporated by reference herein in its entirety.

What is claimed is:

1. A communicating apparatus comprising:
a reception unit configured to be able to receive a plurality types of commands for performing wireless communication;
a determination unit configured to determine, based on a receiving order of the plurality types of commands, an operating mode of the communicating apparatus from a software AP (Access Point) mode, a WiFi Direct mode, and a WiFi Direct extended mode; and
an operating unit configured to operate the communicating apparatus in the operating mode determined by the determination unit,
wherein the determination unit determines the operating mode to be the software AP mode, in a case where the reception unit receives a probe request for searching an apparatus and a wireless connection request in succession,
the determination unit determines the operating mode to be the WiFi Direct extended mode, in a case where the reception unit receives a probe request for searching an apparatus and a confirmation request which includes an attribute information of the WiFi Direct extended mode in succession, and
the determination unit determines the operating mode to be the WiFi Direct mode, in a case where the reception unit receives a probe request for searching an apparatus and a confirmation request which does not include the attribute information of the WiFi Direct extended mode in succession, and
wherein the confirmation request is transmitted to confirm information of a partner apparatus.

2. The apparatus according to claim 1, wherein the confirmation request is a provision discovery.

3. The apparatus according to claim 1, wherein, in a case where the determination unit determines the operating mode to be the WiFi Direct extended mode or the WiFi Direct mode, the communicating apparatus performs a role decision process.

4. The apparatus according to claim 1, wherein, in a case where a command which is received successively after receiving the probe request is different from any of the wireless connection request, the confirmation request, or a command to be used in the role decision process, the command which is received successively after receiving the probe request is discarded and the determination by the determination unit is repeatedly performed.

5. The apparatus according to claim 4, wherein, in a case where the command which is received successively after receiving the probe request is the confirmation request or the command to be used in the role decision process, the role decision process is performed.

6. The apparatus according to claim 1, further comprising a print unit.

7. The apparatus according to claim 1, wherein in a case where an operation of the communicating apparatus by the operating mode determined by the determination unit ends, a wireless connection which is connected during the operating mode determined by the determination unit is disconnected.

8. A communicating method for a communicating apparatus, the method comprising:
receiving a plurality types of commands for performing wireless communication;
determining, based on a receiving order of the plurality types of commands, an operating mode of the communicating apparatus from a software AP (Access Point) mode, a WiFi Direct mode, and a WiFi Direct extended m6ode; and
operating the communicating apparatus in the operating mode determined by the determinating,
wherein the determining determines the operating mode to be the software AP mode, in a case where the receiving receives a probe request for searching an apparatus and a wireless connection request in succession,
the determining determines the operating mode to be the WiFi Direct extended mode, in a case where the receiving receives a probe request for searching an apparatus and a confirmation request which includes an attribute information of the WiFi Direct extended mode in succession, and
the determining determines the operating mode to be the WiFi Direct mode, in a case where the receiving receives a probe request for searching an apparatus and a confirmation request which does not include the attribute information of the WiFi Direct extended mode in succession, and
wherein the confirmation request is transmitted to confirm information of a partner apparatus.

9. The method according to claim 8, wherein the confirmation request is a provision discovery.

10. The method according to claim 8, wherein, in a case where the determining determines the operating mode to be the WiFi Direct extended mode or the WiFi Direct mode, the communicating apparatus performs a role decision process.

11. The method according to claim 8, wherein, in a case where a command which is received successively after receiving the probe request is different from any of the wireless connection request, the confirmation request, or a command to be used in the role decision process, the command which is received successively after receiving the probe request is discarded and the determining is repeatedly performed.

12. The method according to claim 11, wherein, in a case where the command which is received successively after receiving the probe request is the confirmation request or the command to be used in the role decision process, performing the role decision process.

13. The method according to claim 8, further comprising a print step.

14. The method according to claim 8, wherein in a case where an operation of the communicating apparatus by the operating mode determined by the determining ends, a wireless connection which is connected during the operating mode determined by the determining is disconnected.

15. A non-transitory computer-readable storage medium storing a program for performing a communicating method for a communicating apparatus, the program having instructions which, when executed by a computer, perform the communicating method, the communicating method comprising:

receiving a plurality types of commands for performing wireless communication;

determining, based on a receiving order of the plurality types of commands, an operating mode of the communicating apparatus from a software AP (Access Point) mode, a WiFi Direct mode, and a WiFi Direct extended mode; and operating the communicating apparatus in the determined operating mode, wherein the operating mode is determined to be the software AP mode, in a case where a probe request for searching an apparatus and a wireless connection request are received in succession, the operating mode is determined to be the WiFi Direct extended mode, in a case where a probe request for searching an apparatus and a confirmation request which includes an attribute information of the WiFi Direct extended mode are received in succession, and the operating mode is determined to be the WiFi Direct mode, in a case where a probe request for searching an apparatus and a confirmation request which does not include the attribute information of the WiFi Direct extended mode are received in succession, and wherein the confirmation request is transmitted to confirm information of a partner apparatus.

* * * * *